United States Patent [19]
Klemer

[11] 3,985,104
[45] Oct. 12, 1976

[54] AUTOMATIC ANIMAL FEEDER DEVICE

[75] Inventor: Zvi Klemer, Flushing, N.Y.

[73] Assignee: Lawrence Peska Associates, Inc., New York, N.Y. ; a part interest

[22] Filed: Aug. 6, 1975

[21] Appl. No.: 602,427

[52] U.S. Cl. ............................ 119/51.12; 119/51.5
[51] Int. Cl.² ...................................... A01K 5/02
[58] Field of Search .................... 119/51.11–51.15, 119/51.5

[56] References Cited
UNITED STATES PATENTS

| | | | |
|---|---|---|---|
| 3,577,957 | 5/1971 | Sandig | 119/51.5 |
| 3,599,608 | 8/1971 | Esquival | 119/51.12 |
| 3,638,618 | 1/1972 | Strother | 119/51.12 |
| 3,874,341 | 4/1975 | Riba | 119/51.12 |

Primary Examiner—Robert Peshock
Assistant Examiner—Peter K. Skiff

[57] ABSTRACT

An automatic animal feeder device for providing a constant supply of solid food and water includes a housing having an upper and a lower compartment therein. An open top receptacle is mounted externally to the housing. A tube leads from the upper compartment through the housing to the receptacle for delivery of a water supply from the upper compartment. A pair of drawers are slidably contained in the lower compartment of the housing, wherein the drawers are adapted to receive a supply of animal food. A mechanism is provided for retaining the drawers within the lower compartment and for selectively releasing the drawers at predetermined times to move outwardly from the housing.

3 Claims, 3 Drawing Figures

U.S. Patent   Oct. 12, 1976   3,985,104
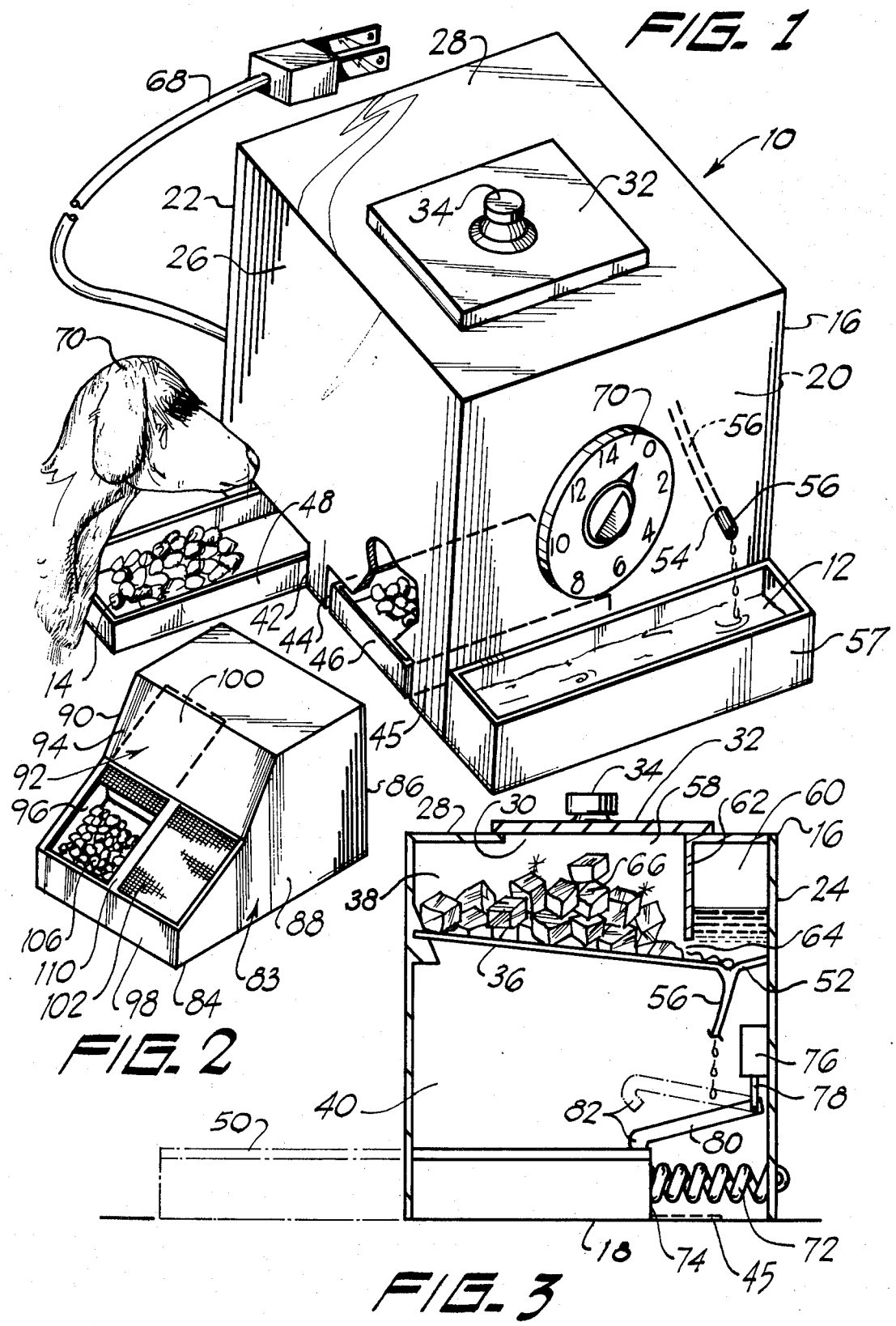

AUTOMATIC ANIMAL FEEDER DEVICE

BACKGROUND OF THE INVENTION

U.S. Pat. No. 3,754,527 provides an animal feeding device of complicated design which employs buckets within a housing for holding and dumping food into an eating receptacle.

U.S. Pat. No. 3,232,274 provides an animal feeding device which consists of an open top tray having a movable cover over the open top eating receptacle. U.S. Pat. No. 2,791,984 provides an animal feeding device with a revolving tray for holding the food within the housing. These aforementioned patents are nonapplicable to my present invention.

SUMMARY OF THE INVENTION

My present invention relates to a unique and novel device for supplying a constant quantity of food and water to an animal during the absence of the animal's owner.

Accordingly, it is an object of my present invention to provide a device for supplying food at predetermined times to an animal, as well as a constant supply of water to the animal, whereby the ice cubes prevent spoilage of the food.

A further object of my present invention is to provide an animal feeding device of simple design and relatively small size for convenient storage.

Briefly, my present invention comprises a housing having an upper and lower compartment therein. An open top receptacle is mounted externally to the housing. A tube leads from the upper compartment through the housing to the receptacle for delivery of a water supply from the upper compartment. A pair of drawers are slidably contained in the lower compartment of the housing, wherein the drawers are adapted to receive a supply of animal food. A mechanism is provided for retaining the drawers within the lower compartment and for selectively releasing the drawers at predetermined times to move outwardly from the housing.

BRIEF DESCRIPTION OF THE DRAWINGS

The objects and features of the invention may be understood with reference to the following detailed description of an illustrative embodiment of the invention, taken together with the accompanying drawings in which:

FIG. 1 illustrates a perspective view of a first embodiment of an automatic animal feeder device;

FIG. 2 illustrates a perspective view of an alternate embodiment of the automatic animal feeder device; and FIG. 3 illustrates a side cross sectional view of the first embodiment of the device.

DESCRIPTION OF THE PREFERRED EMBODIMENT

Turning now descriptively to the drawings, in which similar reference characters denote similar elements throughout the several views, FIGS. 1, 3 show an automatic animal feeder device for feeding an animal water 12 or food 14. The device 10 comprises a housing 16 having a base 18, a pair of upward extending sidewalls 20, 22, an upward extending rear wall 24, an upward extending front wall 26, and a top 28. The top 28 has a large opening 30 therethrough, wherein a cover 32 having a knob handle 34 thereon fits over opening 30. A slanted intermediate wall 36 is contained with housing 16, wherein wall 36 is affixed to the inside surfaces of walls 20, 22, 24, 26 such that wall 36 forms an upper 38 and a lower 40 compartment within the housing 16. The front wall 26 at a lower end thereof has two rectangularly shaped apertures 42, 44 therethrough. A pair of drawer guide assemblies 45 are mounted on the upper surface of base 18 within compartment 40. A pair of open top drawers 46, 48 insert inwardly through apertures 42, 44 to be slidably contained in guide assemblies 45. Each drawer 46, 48 is adapted to receive a quantity of animal food 14 therein. The intermediate wall 36 has a first hole 52 therethrough and one sidewall 20 has a second hole 54 therethrough. A tube 56 mounted through hole 52 into upper compartment 38 extends downwardly through compartment 40 and outwardly through hole 54. An open top rectangularly shaped water receptacle 57 is joined to housing 16 along the lower end of sidewall 20. The upper compartment 40 is divided into two sections 58, 60 by a vertical intermediate wall 62 extending downwardly from the top 28, wherein an air gap 64 exist between the lower end of wall 62 and the upper surface of wall 36. Ice cubes 66 are inserted through opening 30 into section 58. As the ice cubes 66 melt, the water 12 formed moves into section 60 through air gap 64. The water 12 drips through tube 56 into receptacle 57 thereby providing the animal 71 with a constant supply of cool water 12. An electric timer unit 70 is mounted in sidewall 20. Tension springs 72 are mounted between the rear wall 74 of each drawer 46, 48 and the inside surface of the rear wall 24 of housing 16, wherein the drawers 46, 48 move outwardly through apertures 42, 44, when not restricted by retaining means. The retaining means for each drawer 46, 48 comprises a solenoid switching member 76 having a downwardly extending rod member 78 affixed to the inside surface of rear wall 24 above each drawer 46, 48. A J shaped member 80 is affixed to the lower end of each member 78, wherein the hooked end 82 of each member 80 hooks over the rear wall 74 of each drawer 46, 48. Each solenoid member 76 is wired to timer unit 70 which is either battery powered or has an electric cord 68 adapted to be received in a power source. The timer unit 70 is designed to independently activate each solenoid member 76 allowing drawers 46, 48 to move outwardly from housing 16 at different preselected times as the J shaped member is disengaged from the drawers 46, 48 as the rod member 78 moves upwardly. Each drawer 46, 48 is adapted to receive animal food 14 thereby permitting the animal 70 a constant supply of water 12.

FIG. 2 shows a second embodiment of the device 10. The housing 83 of the device 10 has a base 84 an upwardly extending rear wall 86, a pair of upwardly extending side walls 88, 90 and a top 92. The front wall 92 consists of an upper vertical portion 94 extending downwardly from the top 92 to a midpoint. An intermediate portion 96 extends downwardly and outwardly at an obtuse angle from portion 94. A lower vertical portion 98 extends vertically downward from the outer end of portion 96 wherein a lower end of portion 98 is joined to base 84. A pair of slidable panels 100, 102 are contained in portion 96, wherein panels 100, 102 slide upwardly into housing 83. The movement of panels 100, 102 are controlled by solenoids and a timer unit as generally described in FIGS. 1, 3. The interior compartment of the housing 83 below portion 96 is divided into two sections 106, by a vertical intermediate wall 110 thereby forming two chambers below panels 100, 102, wherein each panel is adapted to receive solid animal food 14.

Since obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. An automatic animal feeder device, which comprises:
   a. a housing having a base, a top with an opening therethrough, a plurality of upwardly extending walls, one said wall having a second hold therethrough, another said wall having a pair of elongated slotted apertures therethrough, and an intermediate slanted wall disposed within said housing for forming upper and lower chambers within said housing, said intermediate wall having a first hole therethrough;
   b. a open top water receptacle mounted onto an exterior surface of one sidewall below said second hole;
   c. a tube extending through said first and said second holes, said tube transferring water from said upper compartment to said open top receptacle, said water formed from ice melting within said upper compartment;
   d. a pair of drawer guide assemblies mounted on an upper surface of said base within said lower compartment, each said guide assembly aligned with one said aperture;
   e. a drawer slideably contained in each said guide assembly through each said aperture, each said drawer adapted to receive animal food therein;
   f. a spring mounted between each said drawer and an inner surface of rear wall;
   g. a solenoid switching member having a downwardly extending rod mounted on said inside surface of said rear wall above each said drawer;
   h. a J-shaped member affixed to each said rod, each said J-shaped member engaging and retaining each said drawer within said lower compartment;
   i. a timer unit electrically communicating with each said solenoid member to independently activate each said solenoid member; and
   j. a cover fitting over said opening in said top.

2. A device according to claim 1, wherein said timer unit is powered by batteries.

3. A device according to claim 1, wherein said timer unit is powered by an outside power source.

* * * * *